(12) United States Patent
Hartell et al.

(10) Patent No.: US 9,383,562 B2
(45) Date of Patent: Jul. 5, 2016

(54) OPTICAL ARRANGEMENT

(75) Inventors: Nicholas Anthony Hartell, Letchworth Garden City (GB); Franck Pierre Martial, Leicester (GB)

(73) Assignee: University of Leicester, Leicester (GB)

( * ) Notice: Subject to any disclaimer, the term of this patent is extended or adjusted under 35 U.S.C. 154(b) by 432 days.

(21) Appl. No.: 13/884,679

(22) PCT Filed: Nov. 11, 2011

(86) PCT No.: PCT/GB2011/052196
§ 371 (c)(1),
(2), (4) Date: Jun. 7, 2013

(87) PCT Pub. No.: WO2012/063075
PCT Pub. Date: May 18, 2012

(65) Prior Publication Data
US 2014/0043460 A1 Feb. 13, 2014

(30) Foreign Application Priority Data

Nov. 12, 2010 (GB) .................................. 1019181.5

(51) Int. Cl.
*H04N 9/47* (2006.01)
*G02B 21/00* (2006.01)
*G02B 17/06* (2006.01)
(Continued)

(52) U.S. Cl.
CPC ........ *G02B 21/0032* (2013.01); *G02B 17/0615* (2013.01); *G02B 17/0636* (2013.01); *G02B 21/004* (2013.01); *G02B 21/364* (2013.01);
(Continued)

(58) Field of Classification Search
CPC ................................... G02B 21/06; G01J 1/42

USPC .............................. 348/79; 250/200; 359/385
See application file for complete search history.

(56) References Cited

U.S. PATENT DOCUMENTS

| 3,748,015 A | 7/1973 | Offner | |
|---|---|---|---|
| 2003/0035109 A1* | 2/2003 | Hartwich | G01N 21/6452 356/435 |

(Continued)

FOREIGN PATENT DOCUMENTS

| JP | 2006196559 A | | 7/2006 |
|---|---|---|---|
| JP | 2006196559 A | † | 7/2006 |

(Continued)

OTHER PUBLICATIONS

Ward, Seamus, "International Search Report" for PCT/GB2011/052196, as mailed Apr. 27, 2012, 6 pages.

(Continued)

*Primary Examiner* — Thai Tran
*Assistant Examiner* — Mishawn Hunter
(74) *Attorney, Agent, or Firm* — Winstead PC

(57) ABSTRACT

The present disclosure relates to an improved optical arrangement for an optical imaging system or the like, comprising: an optical device; a digital micromirror device having a plurality of individually addressable micromirrors; a convex mirror; and a concave mirror concentric to the convex mirror. The convex mirror and the concave mirror define an optical triplet which is located in an optical path with the digital micromirror device and the optical device. The concave mirror comprises two concave mirror sections, one or both concave mirror sections being moveable relative to the convex mirror so as to control an image mapping between the digital micromirror device and the optical device.

25 Claims, 7 Drawing Sheets

(51) Int. Cl.
*G02B 21/36* (2006.01)
*G02B 26/08* (2006.01)

(52) U.S. Cl.
CPC .......... *G02B 21/365* (2013.01); *G02B 26/0833* (2013.01)

(56) References Cited

U.S. PATENT DOCUMENTS

| | | |
|---|---|---|
| 2005/0249396 A1 | 11/2005 | Cerrina et al. |
| 2005/0270528 A1 | 12/2005 | Geshwind et al. |
| 2009/0109525 A1* | 4/2009 | Yamawaki ............ G02B 21/086 359/385 |
| 2010/0321484 A1* | 12/2010 | Kishima ............... G02B 21/365 348/79 |
| 2011/0089315 A1* | 4/2011 | Walt .................... G02B 17/0615 250/251 |

FOREIGN PATENT DOCUMENTS

| | | |
|---|---|---|
| WO | WO-98/28655 A2 | 7/1998 |
| WO | WO-2009/002537 A1 | 12/2008 |

OTHER PUBLICATIONS

Heintzmann, R. et al., "A dual path programmable array microscope (PAM): simultaneous acquisition of conjugate and non-conjugate images", Journal of Microscopy, vol. 204, Pt 2, Nov. 2001, pp. 119-137.

Hanley, Q.S. et al., "An optical sectioning programmable array microscope implemented with a digital micromirror device", Journal of Microscopy, vol. 196, Pt 3, Dec. 1999, pp. 317-331.

R. Heintzmann et al., "A dual path programmable array microscope (PAM): simulataneous acquisition of conjugate and non-conjugate images," pp. 119-137, Nov. 2001, Journal of Microscopy, vol. 204, Pt 2.†

Q.S. Hanley et al., "An optical sectioning programmable array microscope implemented with a digital micromirror device," pp. 317-331, Dec. 1999, Journal of Microscopy, vol. 196, Pt. 3.†

\* cited by examiner
† cited by third party

OPTICAL ARRANGEMENT

FIELD OF THE INVENTION

The present invention relates to an improved optical arrangement and method of using same, and to exemplary devices employing the present invention such as a confocal microscope. In particular, the improved optical arrangement comprises a digital micromirror device, an optical device and a modified Offner triplet which maps the two devices, and there is also disclosed a method of mapping a confocal microscope image onto an imaging device.

BACKGROUND OF THE INVENTION

In conventional fluorescence microscopy, more than 90% of the observed fluorescence may originate from parts of the sample that are out of focus and this scattered light from planes above and below the area-of-interest obscures the detail of the specimen within the desired plane of focus.

Confocal microscopes overcome this problem by using a stationary pinhole located in a conjugate image plane which serves to reject light that originates outside the plane of focus and as such, this improves the apparent spatial resolution of the image.

As elegant a solution as this may be, taking the example of a confocal laser scanning microscope (CLSM), sequential scanning on a point by point basis limits the speed of image acquisition; as a result even the fastest commercial instruments are unable to resolve the temporal dynamics of the fastest cellular events.

An alternative approach to faster scanning that suffers neither from reduced image quality nor reduced optical sectioning is to scan multiple beams in parallel and use an array of pinholes and detectors to collect the image. Scanning disk systems such as the Nipkow disk are based on a spinning mask of pinholes that can simultaneously illuminate many discrete points. When the disk spins at high speed, laser light passes through the pinholes and illuminates the whole specimen almost simultaneously. A camera is used to collect the light that passes back through the pinholes. Optical sectioning occurs because light emitted above or below the focal plane does not return through the pin holes.

However, a major disadvantage of scanning disk systems is that they generally suffer from very low light throughput. Much of the illumination light is rejected by the disc because the spacing between neighbouring pinholes must be large to maintain the confocal effect (light that would otherwise be rejected may be able to pass through a neighbouring pinhole instead). In an ideal case, image acquisition speed should be limited by the camera frame rate but in practice, the actual speed is limited by the low amount of light that passes through the pinholes and the sensitivity of, for example, CCD cameras, necessitating longer exposure times.

The introduction of microlenses to spinning Nipkow disks, that enhance the transmission of excitation light, and electron magnifying (EM) CCD cameras, which improve detection efficiency, have improved the utility of these systems but the quality of results obtained from these systems depends entirely on the brightness of the specimen and so their efficacy depends on the particular application. However, low light throughput remains an issue. The Applicant has identified that part of the problem lies in being able to make use of as much light as possible. Nipkow disks have other significant limitations. First, they have fixed pinhole diameters and spacing. These two factors determine the level of optical sectioning and they can only be optimised for one particular numerical aperture of the objective lens. Although some systems may allow the disk to be changed, this would be inconvenient and require re-alignment of the optical pathway.

This problem has been overcome to an extent with the development of optically sectioning microscopes that utilise a digital micromirror device (DMD) as a spatial light modulator to provide optical sectioning (inc. fluorescence, widefield and confocal) at high spatial resolution and improved frame rates (in certain examples up to 100 Hz). The DMD acts as a solid state Nipkow disk but with the added ability to change the "pinhole" size and separation and to control the light intensity on a mirror by mirror basis. Different pinhole patterns can also be used over different regions of the field of view to allow alterations in light intensity or differing levels of optical sectioning within a field of view. The DMD can also be used for spatially defined photo-activation and so the system can be used for photolytic release of caged compounds, photoactivation or photoconversion of fluorescent proteins and fluorescent recovery after photobleaching (FRAP) measurements.

Nonetheless, it is an object of the present invention to provide an improved optical arrangement that overcomes one or more deficiencies of existing confocal microscopes.

However, it is realised that the present invention has utility in broader applications than solely confocal microscopes.

Therefore, it is a further object of the present invention to provide an improved optical arrangement that may result in improved performance in optical imaging systems and the like.

SUMMARY OF THE INVENTION

According to a first aspect of the present invention, there is provided an improved optical arrangement for an optical imaging system or the like, comprising:
  an optical device;
  a digital micromirror device having a plurality of individually addressable micromirrors;
  a convex mirror; and
  a concave mirror concentric to the convex mirror;
  wherein the convex mirror and the concave mirror define an optical triplet, said optical triplet located in an optical path with the digital micromirror device and the optical device; and
  wherein the concave mirror comprises two concave mirror sections, one or both concave mirror sections moveable relative to the convex mirror so as to control an image mapping between the digital micromirror device and the optical device.

The optical triplet is a modified Offner triplet (or relay). Not only does the optical system overcome the astigmatism caused by the angled reflection of light from the digital micromirror device (whether from an external source to the optical device or vice versa), but it allows diffraction-limited operation without chromatic dispersion. Of crucial importance is that the modified Offner triplet allows control of magnification which means that a one-to-one mapping (or indeed any kind of mapping) of an image between the digital micromirror device and the optical device can be achieved.

The convex and concave mirrors may be fixed in position. The final mirror in the configuration may be mounted on a micrometer screw drive or similar motorised system to allow easy control of magnification. This could allow automatic adjustment of the magnification, for example to map individual DMD mirrors onto camera pixels.

Optionally, the optical device comprises an imaging device. Alternatively, the optical device comprises a light source.

The present invention may therefore be used to map an image incident on the digital micromirror device onto a detector (e.g. for use in an optical microscope or telescope) or alternatively map an image from a light source onto the digital micromirror device (e.g. for use in a digital projector) in such a way that the resulting image is corrected (or modified in some desired way).

Optionally, the imaging device is a CCD detector. Alternatively, the imaging device is selected from the group comprising EM CCD camera, CMOS camera, and an array of detectors or photomultipliers.

Alternatively, the light source is a display.

According to a second aspect of the present invention, there is provided an improved microscope comprising:
 a light source;
 an objective lens configured to illuminate a specimen with light from the light source and collect light from the specimen; and
 an improved optical arrangement according to the first aspect in which the optical device is an imaging device;
 wherein the digital micromirror device is configured to direct at least a portion of a beam of light from the light source to the objective lens, and to direct at least a portion of a beam of light from the objective lens to the imaging device via the optical triplet.

Preferably, the improved microscope further comprises a dichroic mirror positioned between the digital micromirror device and the optical triplet, the dichroic mirror selected to reflect light from the light source and transmit light from the specimen.

Preferably, the improved microscope further comprises an emission filter positioned between the dichroic mirror and the imaging device and selected to absorb light at the wavelength of the light source. The emission filter can alternatively be located anywhere else between the dichroic mirror and the detector.

Preferably, the improved microscope further comprises a tube lens positioned between the digital micromirror device and the objective lens to control the size of a cross section of the beam of light from the objective lens at the digital micromirror device.

Preferably, the improved microscope further comprises a beam expander positioned between the light source and digital micromirror device, the beam expander configured to increase the width of the beam of light from the light source to illuminate a plurality of micromirrors of the digital micromirror device.

The digital micromirror device is typically configured to direct at least a portion of a beam of light from the light source to the objective lens along an optical path, and the improved microscope may further comprise one or more additional lenses provided in said optical path. This allows the primary conjugate image plane, and thus the required position of the digital micromirror device, to be moved to a more convenient location if required.

In one embodiment, the light source is a first light source and the improved microscope of the second aspect of the invention further comprises a second light source. Typically, the digital micrometer device is configured to direct at least a portion of a beam of light from the second light source to the objective lens.

Preferably, the first light source is configured to emit light having a first optical emission spectrum and the second light source is configured to emit light having a second optical emission spectrum different from the first optical emission spectrum. This allows light from the second light source to perform a different function to the light emitted by the first light source. For example, light from the second light source may be used for photo-uncaging, photoconversion, FRAP analysis, structured illumination or near simultaneous photo release.

In one embodiment, the second optical emission spectrum is red shifted relative to the first optical emission spectrum. In this case, light from the second source may be used for stimulated emission depletion (STED), Additionally or alternatively, the first light source may be configured to emit light having a first optical power and the second light source may be configured to emit light having a second optical power greater than the first optical power.

Preferably, the first and second light sources are positioned symmetrically about an axis of symmetry passing through the digital micromirror device. Typically, the first light source is positioned on one side of the axis of symmetry and the second light source is positioned on a second side of the axis of symmetry opposite the first side.

In one embodiment, the first and second light sources may be derived from a single light source. Said single light source may be a multi-wavelength source.

According to a third aspect of the present invention, there is provided a method for obtaining an image of a sample using the microscope of the second aspect, comprising the steps:

1. illuminating a plurality of micromirrors of the digital micromirror device with at least a portion of light from the light source;

2. switching a virtual pinhole, consisting of N*N micromirrors of the digital micromirror device, from a first position to a second position at which a portion of the sample is illuminated with light from the N*N micromirrors and a corresponding portion of the imaging device is illuminated with corresponding light from the sample;

3. obtaining an image of the light illuminating the imaging device while the virtual pinhole is in the second position; and 4. repeating steps 2 to 3 for a plurality of subsequent virtual pinholes until a predetermined number of portions of the image have been obtained.

Processing is not required because the complete arrangement of pinholes is covered during a single exposure. However, optionally the method comprises the additional step of processing the portions to obtain the image of the sample.

Preferably, the step of switching the virtual pinhole comprises simultaneously switching a plurality of virtual pinholes separated by an array width P*N, and step 4 comprises repeating steps 2 to 3 until P*P/N images are obtained within a P*P array.

Optionally, step 4 includes that each of the subsequent virtual pinholes are separated from the immediately preceding virtual pinhole by N/2 micromirrors. This may be found to reduce edge effects.

Optionally, the method comprises the step of moving at least one of the mirrors of the optical triplet so as to change the magnification of the image on the imaging device.

Optionally, the method comprises the step of moving at least one of the mirrors of the optical triplet so as to correct astigmatism in an image on the imaging device.

Preferably, the method comprises the step of moving at least one of the mirrors of the optical triplet so as to achieve a one-to-one mapping of one or more micromirrors of the digital micromirror device to one or more pixels of the imaging device.

Optionally, the method comprises the step of adjusting the tube lens of an embodiment of the first aspect, or an additional lens comprised in the microscope, so as to control the size of an illumination spot of light from the sample on the digital micromirror device.

In one embodiment, the light source is a first light source, the method according to the third aspect of the invention further comprising illuminating a plurality of micromirrors of the digital micromirror device with at least a portion of light from a second light source and directing said portion of light from the second light source onto the sample using said plurality of micromirrors.

Preferably, the first light source is configured to emit light having a first optical emission spectrum and the second light source is configured to emit light having a second optical emission spectrum different from the first optical emission spectrum. Additionally or alternatively the first light source may be configured to emit light having a first optical power and the second light source may be configured to emit light having a second optical power greater than the first optical power.

According to a fourth aspect of the present invention, there is provided a projection system comprising an improved optical arrangement of the first aspect in which the optical device is an image source.

According to a fifth aspect of the present invention, there is provided a spectrometer comprising an improved optical arrangement of the first aspect in which the optical device is an optical detector.

According to a sixth aspect of the present invention, there is provided an optical trapping apparatus comprising an improved optical arrangement of the first aspect in which the optical device is a laser.

BRIEF DESCRIPTION OF THE FIGURES

The present invention will now be described by way of example only and with reference to the accompanying figures in which.

Where possible, throughout the description like reference numerals are used to denote like features in different embodiments.

DETAILED DESCRIPTION OF THE INVENTION

Figure 1:
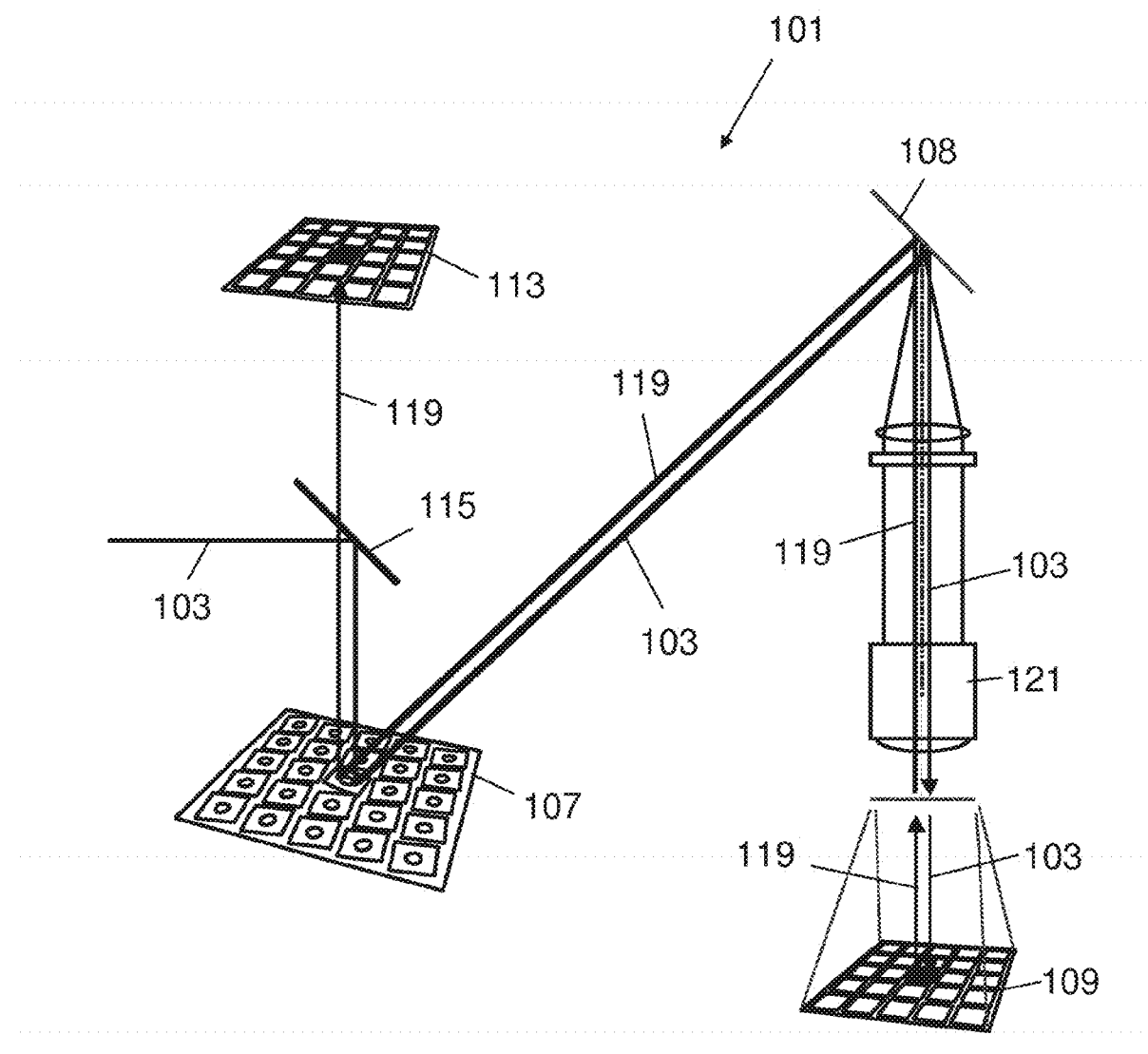
FIG. 1 illustrates in schematic form a confocal microscope including a "digital Nipkow disk" arrangement.

With reference to FIG. 1, there is presented in schematic form a simplified example of a confocal microscope utilising a "digital Nipkow disk" arrangement.

The confocal microscope 101 can be seen to comprise a digital micromirror device (DMD) 107, one micromirror of which steers a beam of light 103 from a light source to a mirror 108 which in turn directs the light 103 onto the specimen 109 via microscope objective 121. Light 119 from the specimen 109 is collected by the microscope tube lens and objective 121 and travels back to the DMD 107, again via mirror 108. Dichroic mirror 115 transmits light 119 and reflects light 103; accordingly light 119 is incident on the imaging device 113 (CCD). Illumination of the sample 109 can be switched on and off by selectively actuating the micromirror upon which the light 109 is incident.

In this simplified example, both beams of light are shown as impinging on a single mirror of the DMD. In practice, a beam expander may be used to expand a laser beam or other light source so as to illuminate the entire DMD (or at least significant portions of the DMD); selectively switching a mirror or a group of mirrors can thereby provide an effect analogous to the pinhole of a conventional confocal microscope.

A specific embodiment of the present invention will now be described with reference to FIG. 2, which is a schematic diagram of the optical layout of a confocal microscope 201 according to an aspect of the present invention (and embodies an optical arrangement according to an aspect of the present invention).

A digital micromirror device DMD 207, optionally fitted with a high speed controller (not shown), is positioned at the primary conjugate image plane as illustrated. The particular DMD 207 used in an exemplary embodiment consists of an array of 1024 by 768 mirrors (SVGA) with a pitch of 13.68 μm. Each mirror can be independently tilted by, in this case, ±12°, generally along a diagonal axis between two different resting positions. Because of the diagonal axis of the micromirror tilt of current DMDs, the DMD 207 can be rotated by 45 degrees to keep the deflection of the mirrors in the plane of the other optical components.

A laser 205, in this example an Argon-ion laser, was used for illumination. It will be readily understood that a light source (which may be a laser, light emitting diode (LED), suitably filtered broadband source, light source that can pre-select a wavelength for example using internal filters, or the like) for such a system will be selected dependent on the application.

The excitation wavelength in this example is selected using a suitable bandpass filter 204 and the beam 203 expanded through a telescope 206 (beam expander) to a diameter of approximately 11 mm and reflected by a dichroic mirror 215 to illuminate a central area of 600×600 micromirrors on the DMD 207 at an angle of 24 degrees. Light reflected from the DMD 207 towards the sample (not shown) passes through a tube lens 220 (in this example f=300 mm) to a microscope objective 221. Light 219 is emitted from the sample, collected by the microscope objective 221 and travels back along the same optical path. The light is then transmitted through the dichroic mirror 215 and an emission filter 222.

Optionally, one or more additional lenses may be inserted (e.g. between the DMD 207 and tube lens 220) to modify the position of the primary conjugate image plane. This may help to provide a more convenient position for the DMD 207 if required.

Note that this represents the most convenient arrangement of light source and filters etc. however the light source, excitation filter, dichroic and emission filters may be moved to any position between the DMD (207) and the imaging means (see 213).

Any single micromirror of the DMD 207 can alternate between one of two resting states; those that project light onto the specimen are designated as being in the "on" position whereas the others are in the "off" position. In addition to controlling the illumination of the specimen, and analogous to conventional confocal microscopy, an "on" mirror or group of "on" mirrors effectively provides a "pinhole" because mirrors in the "off" position will direct light away from the optical path to the CCD. Conventional wide field fluorescence illumination can be achieved by setting all mirrors to the "on" position.

A modified Offner triplet arrangement consisting of three separate curved mirrors; two concave mirrors 223 and 227 (e.g. r=207) and one convex mirror 225 (e.g. r=103.5); and a single flat mirror 229 form an image on the CCD 213 of an EM camera positioned at a second conjugate image plane. Note that the imaging device could be any kind of CCD, CMOS camera, photomultiplier array or the like.

The modified Offner triplet has four principal advantages in relation to the present invention. First, this arrangement allows an image of the DMD 207 to be formed that is normal to the plane of the DMD 207. This overcomes an inherent astigmatism that is caused by the angled reflection of light from the DMD 207.

Second, by employing high reflectivity mirrors a much more efficient transfer of light may be achieved than would be possible with a lens based system.

Third, such an Offner triplet arrangement is achromatic ensuring that images are aligned regardless of emission wavelength (unlike lens or grating based systems that are dispersive).

Fourth, by using physically separate concave mirrors on the outer radius of the optical path (as compared to the conventional Offner triplet which has a single concave mirror instead of the concave mirrors 223,227), altering the position of any of the mirrors (preferably mirror 227) allows control over the magnification of the conjugate image of the DMD 207 on the CCD 213. This allows the pitch of the micromirrors of the DMD 207 to be aligned precisely with the pixels of the CCD camera 213 thus enhancing image resolution and collection efficiency.

In this particular embodiment images are collected with an EM-CCD camera and transferred to a PC (not shown) for recording and analysis.

In summary, a laser beam 203 is filtered 204 and expanded 206 and sent to a DMD 207 via a dichroic mirror 215. Mirrors in an "on" position on the DMD 207 send the excitation light 203 through a tube lens 220 to the microscope objective 221 and the specimen (not shown). Light 219 emitted from the specimen travels back along the same path but is transmitted by the dichroic mirror 215. An emission filter 222 ensures that only the desired excitation wavelength can reach the CCD 213. A modified Offner Triplet arrangement, consisting of three separate curved mirrors 223,225,227, and an optional single flat mirror 229 (which is convenient for alignment purposes) are then used to form and control an image on the CCD 213 of an EM camera positioned at a second conjugate image plane.

In the example presented, the tube lens 220 between the DMD 207 and objective 221 is chosen to provide an overall magnification of ×93 on the DMD 207 when used with a ×60, 1.0 NA water immersion objective. This means that a diffraction limited spot on the specimen would result in an airy disk at the DMD 207 with a diameter that just over-fills an array of 3×3 micromirrors and which just under fills an array of 4×4 micromirrors. The former is therefore just smaller than the optimal pinhole size and the latter just bigger.

Figure 3:
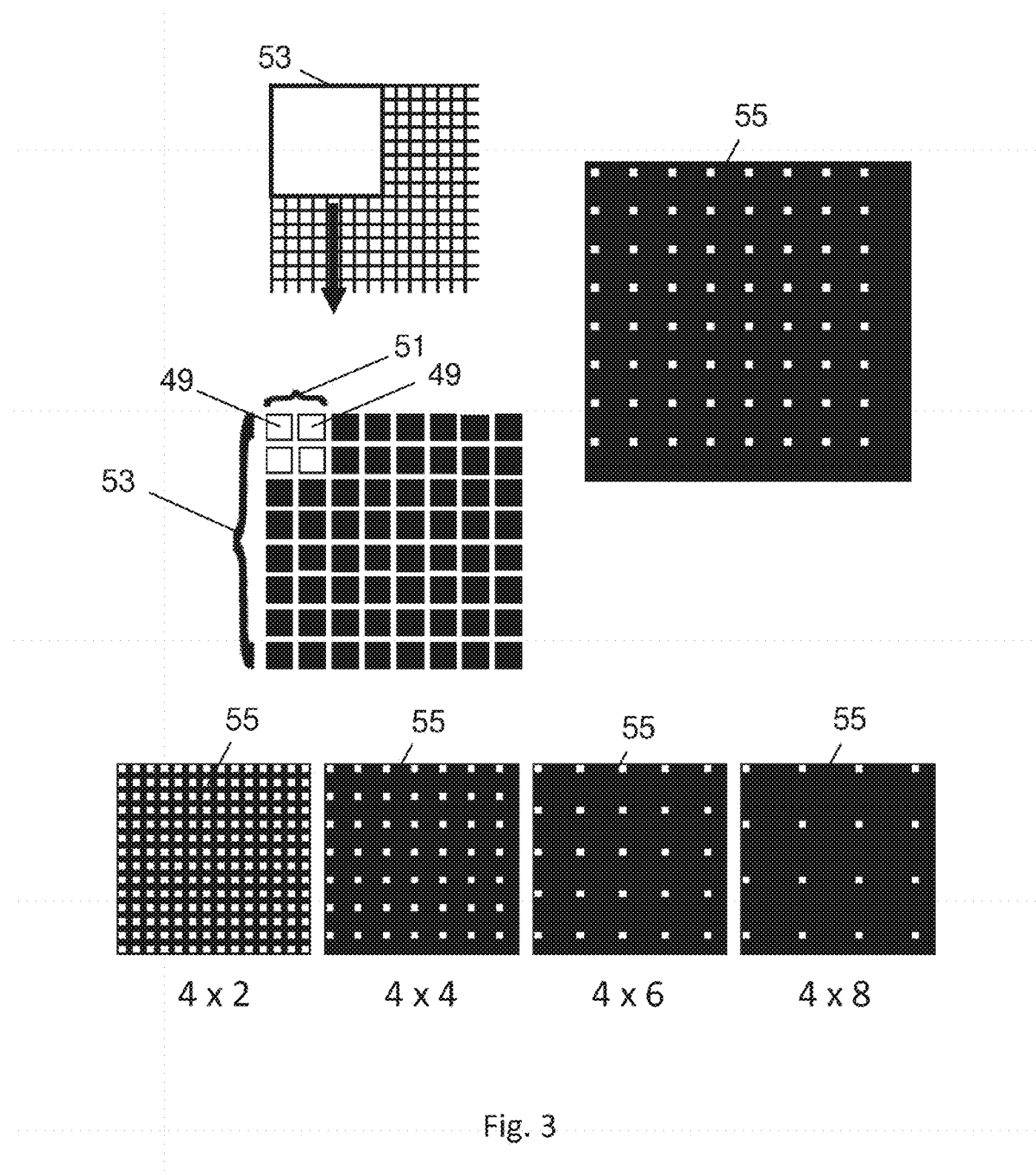
FIG. 3 illustrates in schematic form the selection of "pinholes" and "scanning units" of a digital micromirror device of an embodiment of the present invention.

Referring now to FIG. 3, confocal imaging is achieved by defining patterns of "pinholes" 51 which may comprise one or several micromirrors 49. It is also useful to define these pinholes within an array of scanning units 53 (preferably identical). Each scanning unit 53 is a square array of p×p pinholes 51 each comprising a sub array of n×n micromirrors 49, one pinhole 51 being in the "on" position at any given time. The pinhole 51 is moved sequentially to a different position in the scanning unit 53 until the entire area of the scanning unit 53 has been turned "on". Each scanning unit operates in parallel (illustrated schematically) which means that in the time it takes to complete a scan of one scanning unit the entire working surface 55 of the DMD has been utilised.

Figure 4:
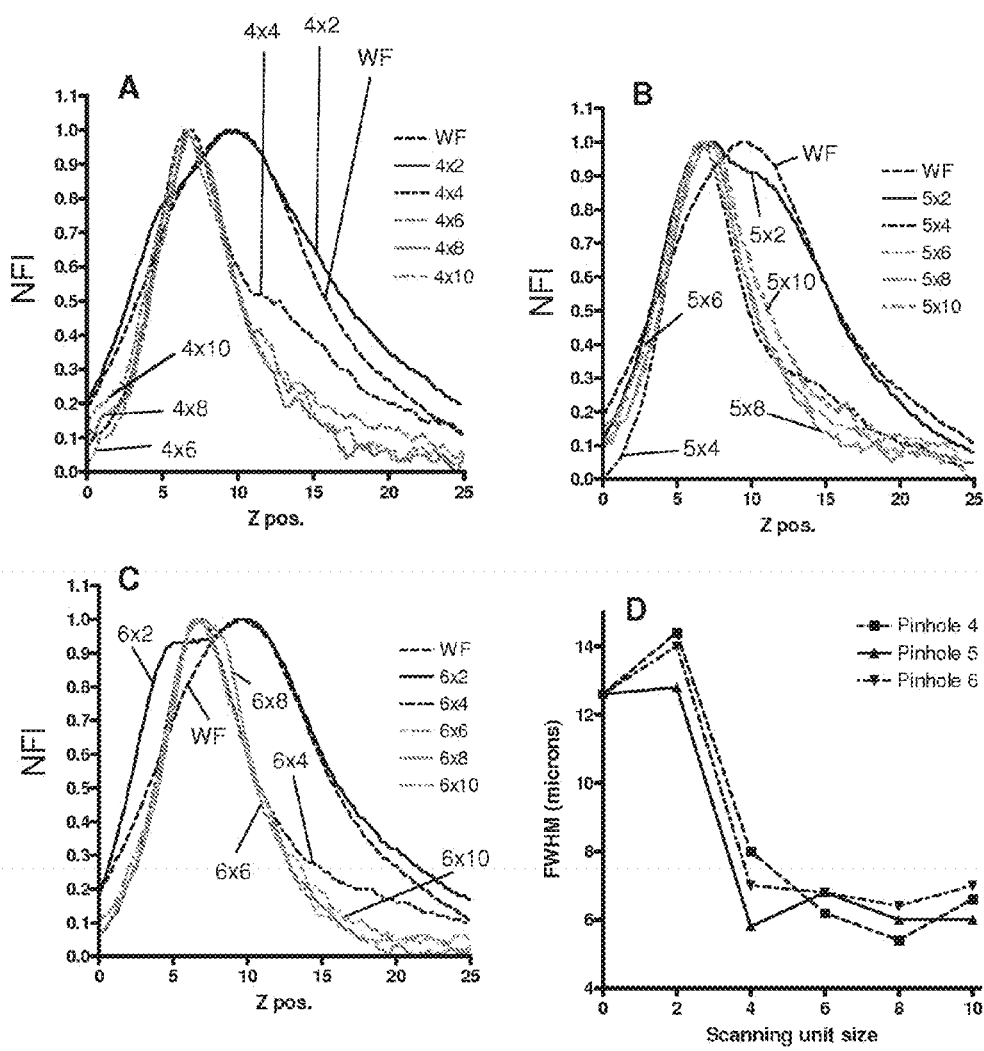
FIG. 4 illustrates (A,B,C) axial fluorescence intensity profiles (the y-axis represents Normalised fluorescence intensity, and the x-axis represents Z-position) obtained in accordance with the present invention with 4 μm beads, recorded with different pinhole configurations, and (D) FWHM of axial profiles for different pinholes vs scanning unit size (in D, the y-axis represents FWHM in microns and the x-axis represents scanning unit size)

The different configurations tested (except widefield) are referred to as N×P; where N equals the size of one side of the pinhole expressed in mirrors, and P equals the size of one side of the scanning unit expressed in pinholes (the upper half of FIG. 4 shows a 2×4 configuration). Different configurations result in different acquisition speeds and levels of confocality. Note that in the Figures that follow, the abbreviation WF refers to widefield. The lower half of FIG. 4 illustrates a 4×2, 4×4, 4×6 and 4×8 configuration from which any other configuration may be extrapolated.

Axial fluorescence intensity profiles computed from 4 μm beads (see FIG. 4) show that in widefield (included as scanning unit size N=0) the peak value is out of focus. In this example a scanning unit size N=2 does not bring significant improvement for any size of pinhole. A significant sectioning effect, in which the out-of-focus light is effectively rejected, only appears for a scanning unit comprising 4 pinholes. However, scanning units larger than 4 pinholes do not greatly improve the level of confocality, with FWHM values consistently between 5.4 and 8.0 μm (FIG. 4D). This means that smaller scanning units can be employed while maintaining rejection of out-of-focus light which allows for a larger number of parallel measurements to be made with a knock-on improvement in acquisition speed.

Figure 5:
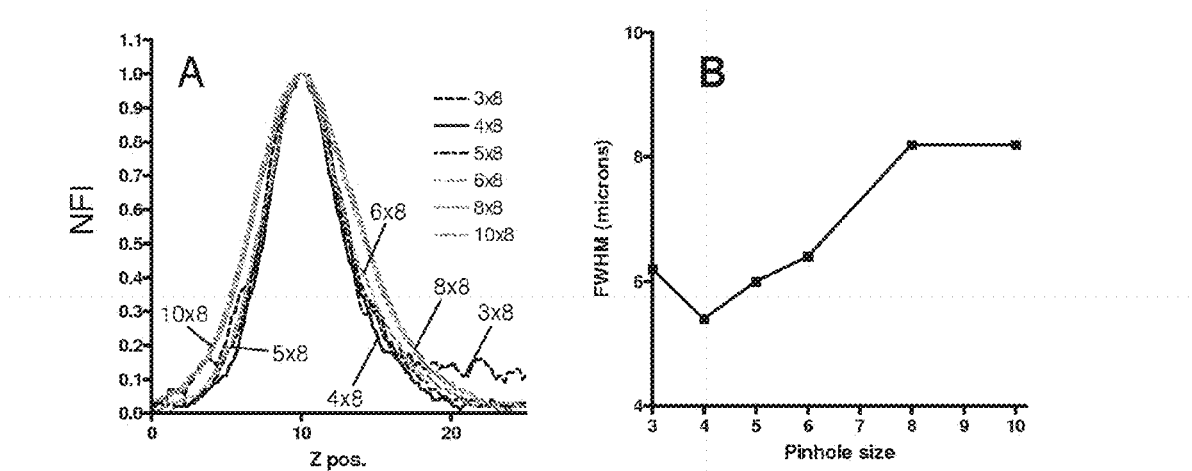
FIG. 5 illustrates (A) the variation in axial fluorescence intensity profile (the y-axis represents Normalised fluorescence intensity, and the x-axis represents Z-position) with different pinholes sizes when imaging 4 μm diameter beads with a given scanning unit size, and (B) FWHM of profiles with different pinholes sizes when imaging 4 μm diameter beads (in B, the y-axis represents FWHM in microns and the x-axis represents pin hole size)

For a given size of scanning unit, changing the pinhole size does affect the level of confocality. In the example shown, pinholes of 3 to 6 mirrors all give a good level of confocality, with an FWHM close to 6 μm, though the best result is obtained with a pinhole of 4 mirrors, with an FWHM of 5.4 μm (see FIG. 5). However, in practice a pinhole of 5 mirrors is preferred in this example because of the mapping to the CCD sensor (see further discussion below).

Figure 6:
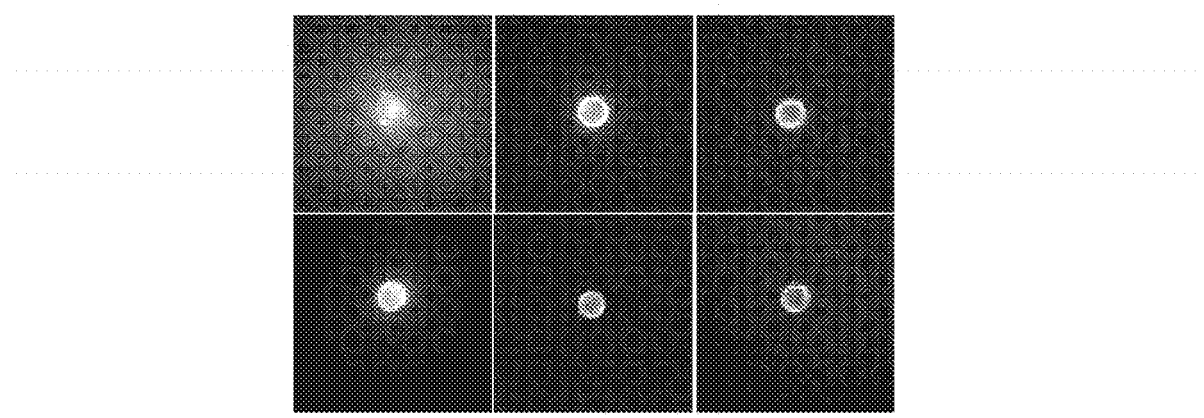
FIG. 6 illustrates a comparison between horizontal mid-section and vertical projection in images of a 6 μm bead recorded in widefield, with a CLSM or with a 5×10 configuration of an embodiment of the present invention.

To illustrate the advantages thereof, and compare confocality, the Applicant has compared images obtained using the above described embodiment of the present invention with images obtained using a standard, commercially available, confocal laser scanning microscope CLSM. FIG. 6 shows the comparison between vertical projection (top row) and horizontal mid-section (bottom row) images of a 6 μm bead recorded in widefield mode (left column), with the CLSM (middle column) and a 5×10 DMD configuration (right column).

On the horizontal plane, with wide field illumination, the dark inner part of the bead is hardly distinguishable on the mid-section image of the bead. The blurring in the vertical projection shows that a significant amount of out-of-focus light (across the entire series of sections) has not been rejected. With both the CLSM and the DMD, the difference between the bright outer ring and the inner part of the bead can be clearly discerned because the out-of-focus light has been rejected. Notably, the dark part of the bead appears darker in the 5×10 DMD system than with the CLSM, which indicates a better resolution.

Figure 7:
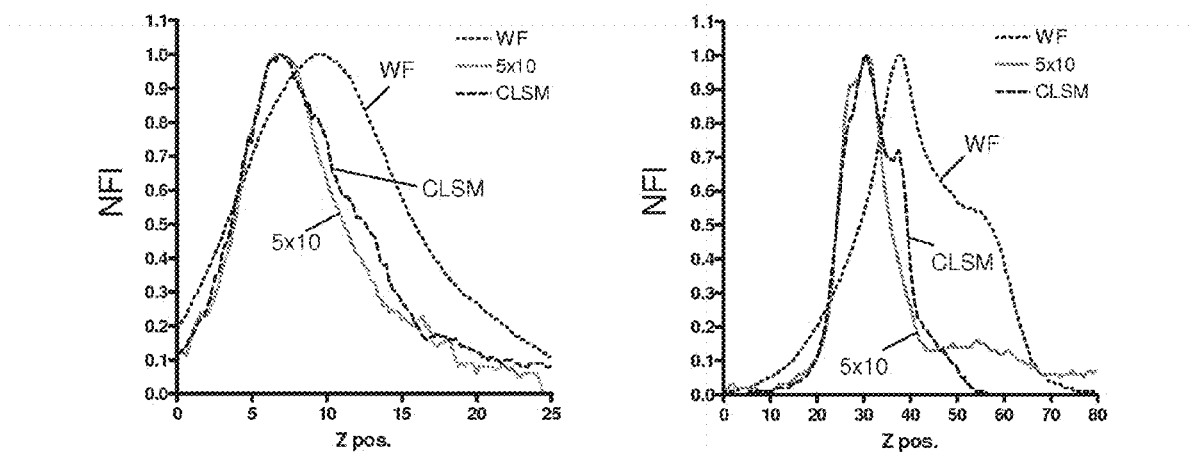
FIG. 7 illustrates the axial fluorescence intensity profile (the y-axis represents Normalised fluorescence intensity, and the x-axis represents Z-position) of 4 μm (left) and 6 μm (right) fluorescent beads obtained from series of pictures (as shown in FIG. 8) taken in widefield (WF), with a CLSM or with a 5×10 configuration of an embodiment of the present invention.

As illustrated by FIG. 7, in the axial section the 5×10 DMD system performs better than the CLSM, demonstrating an improved full width at half maximum (FWHM) for 4 and 6 μm beads, and complete removal of the out-of-focus light for the 6 μm bead.

Improving both spatial and temporal resolution of measurement instruments is a well known challenge and so far confocal microscopy as brought amazing improvement in spatial resolution, but at the cost of temporal resolution. One of the reasons is the poor duty cycle of the scanning/descanning process. Spinning disk systems do offer some improvement but they suffer not only from low light throughput, they also are constrained by the fixed size of their pinhole. As discussed herein spatial light modulators can overcome this limitation, and that is the rationale in developing a DMD based confocal microscope.

However, the emission pathway is certainly the most critical element of the system. In the previously described embodiment, the image is focused in the primary conjugate plane by a tube lens. In the example given the tube lens has a focal length of 300 mm, resulting in an overall magnification of 93× on the DMD. Such a magnification implies a smaller field of view, and the loss of all the light that is outside of the mirror array. In such a configuration, the tube lens is the decisive element for the optimal value of the pinhole size (see FIG. 8). Because of the correlation between a given area in the object plane and its projected size on the DMD, the diffraction limited spot size on the DMD directly depends on the tube lens characteristics. Therefore the pinhole size can be optimised (theoretically 1 Airy disk) by the right choice of the tube lens.

Figure 8:
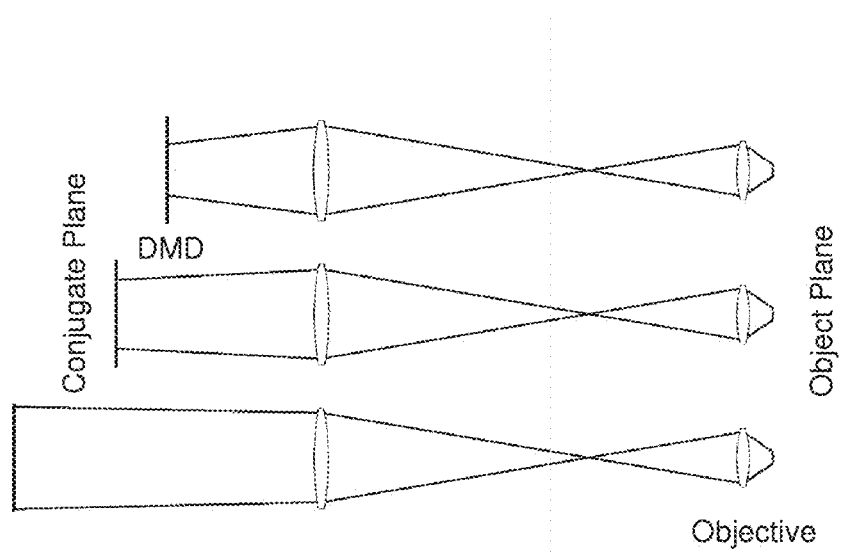
FIG. 8 illustrates the tube lens effect in which the number of micromirrors covered by the light projected from a given area on the object plane depends on the focal length of the tube lens.

For completeness, it is noted that: in the upper of the three arrangements of FIG. 8, four micromirrors are covered by light projected from a given area on the object plane when the tube lens has a focal length of 150 mm; in the middle of the three arrangements of FIG. 8, six micromirrors are covered by light projected from a given area on the object plane when the tube lens has a focal length of 200 mm; and in the lower of the three arrangements of FIG. 8, ten micromirrors are covered by light projected from a given area on the object plane when the tube lens has a focal length of 300 mm.

A conventional Offner triplet (reflective or transmissive) has unity magnification. This means that the image on the DMD would be the same size when it reaches the CCD sensor. However, the pitch of the DMD may not be the same as the pitch of the CCD which can result in a pixel mismatch. In the example embodiment described herein the projected size of one airy disk on the DMD is close to a 4×4 pinhole. However, in practice a pinhole size of 5 is preferably employed because it lets more light through; while it is not optimal for sectioning it is better than using a pinhole of 4 because it may be the case that not enough light will be transmitted. Magnification between DMD and camera is required because the mirrors are slightly smaller than the pixels. Once magnified, 4 mirrors would match 4 pixels. Magnification of the triplet can be changed by moving the position of one concave mirror in the arrangement, by which method said 1:1 relation between the DMD and CCD can be achieved.

A microscope in accordance with the present invention can achieve a good level of confocality and compares well in terms of performance with commercially available and conventional confocal microscopes. The speed of acquisition for similar levels of sectioning is also greatly improved. The size of an image pixel can be only marginally larger than one Airy disk, and the axial resolution is better than the CLSM with which comparisons were carried out.

Figure 9:
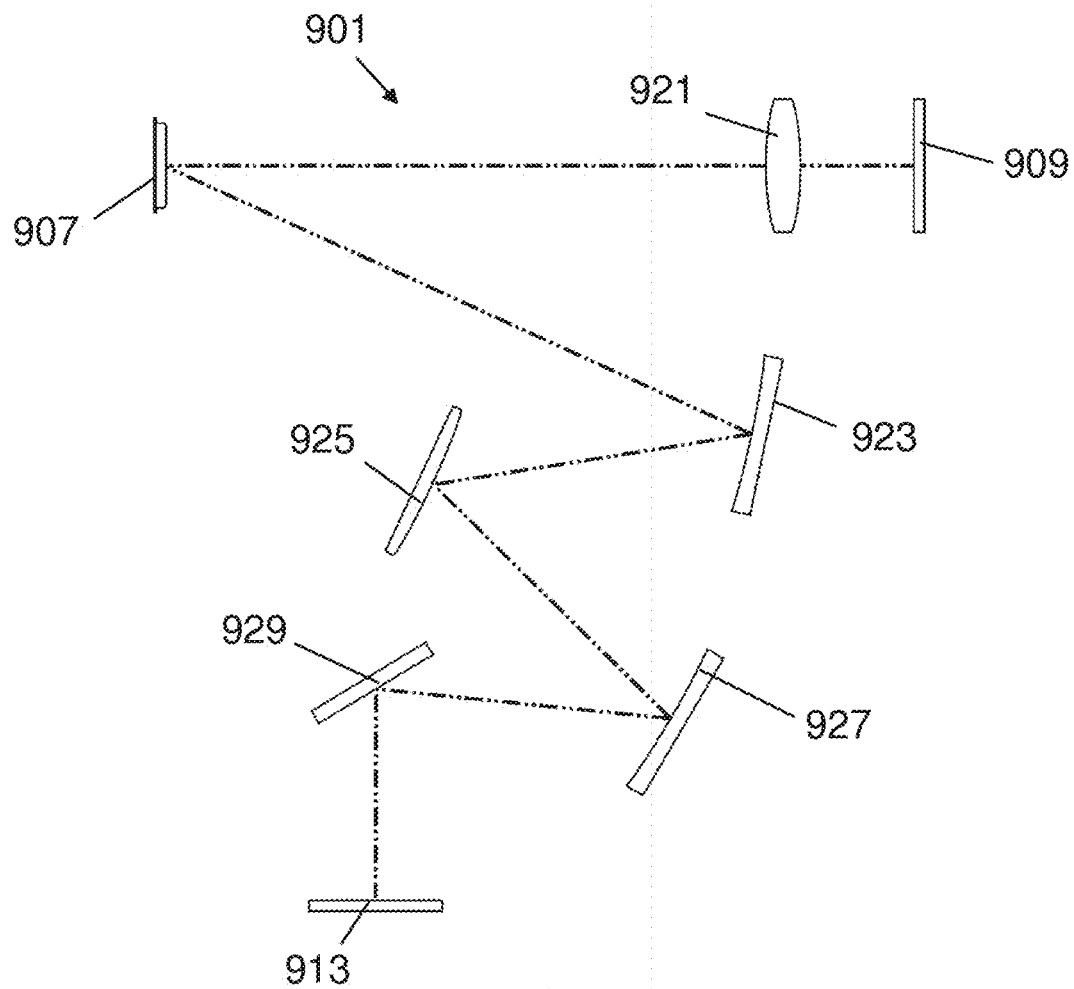
FIG. 9 illustrates in schematic form a digital projection system incorporating a digital micromirror device and a modified Offner triplet in accordance with an alternative embodiment of the present invention.

Additional uses of the modified Offner triplet could include projectors, optical trapping, multi-object spectrometers, 2D Hadamard transform spectral imagers, to name but a few. FIG. 9 presents, in schematic form a projection system 901 (such as might be used in a rear-projection television or digital cinema projector) incorporating a digital micromirror device and a modified Offner triplet in accordance with an alternative embodiment of the present invention.

Figure 2:
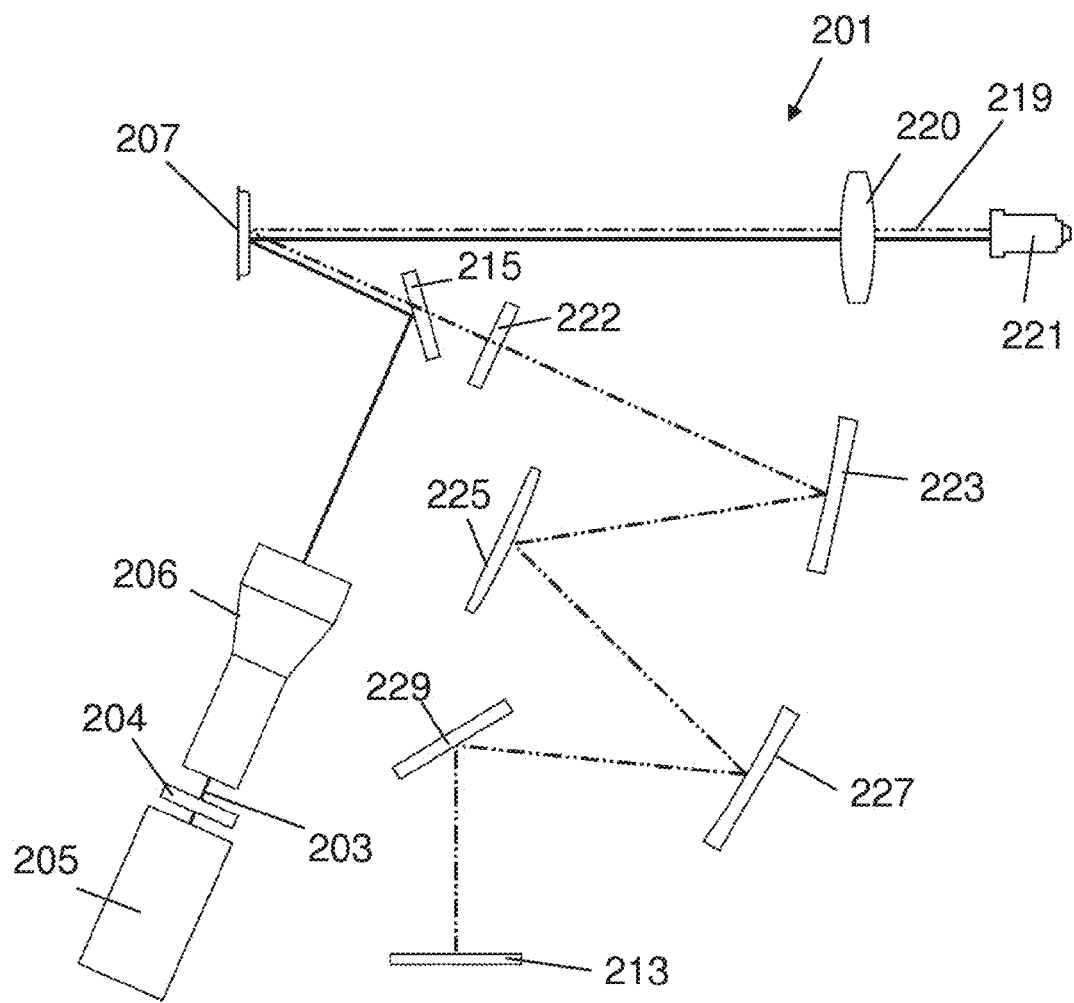
FIG. 2 illustrates in schematic form a confocal microscope incorporating a digital micromirror device and a modified Offner triplet in accordance with an embodiment of the present invention.

An image source 913 is provided in place of the imaging device shown in FIG. 2. A modified Offner Triplet arrangement 923,925,927, and a single flat mirror 929 are then used to form and control an image on the DMD device 907. Manipulation of the modified Offner triplet, for example by movement of mirror 927, allows a mapping of the image to the DMD device 907. Projection or output lens 921 allows projection of the image on the DMD device 907 onto a screen 909. Alternatively, the image source may be a light source, in which case mapping of the light source onto the DMD device provides for more efficient use of light. Selective switching of individual micromirrors, in the manner of a digital light projector, controls the appearance of individual pixels on the screen.

A prism, not shown, may be employed to split light from the image source into three primary colours and for each of said three primary colours a separate DMD and modified Offner triplet arrangement provided.

Figure 10:
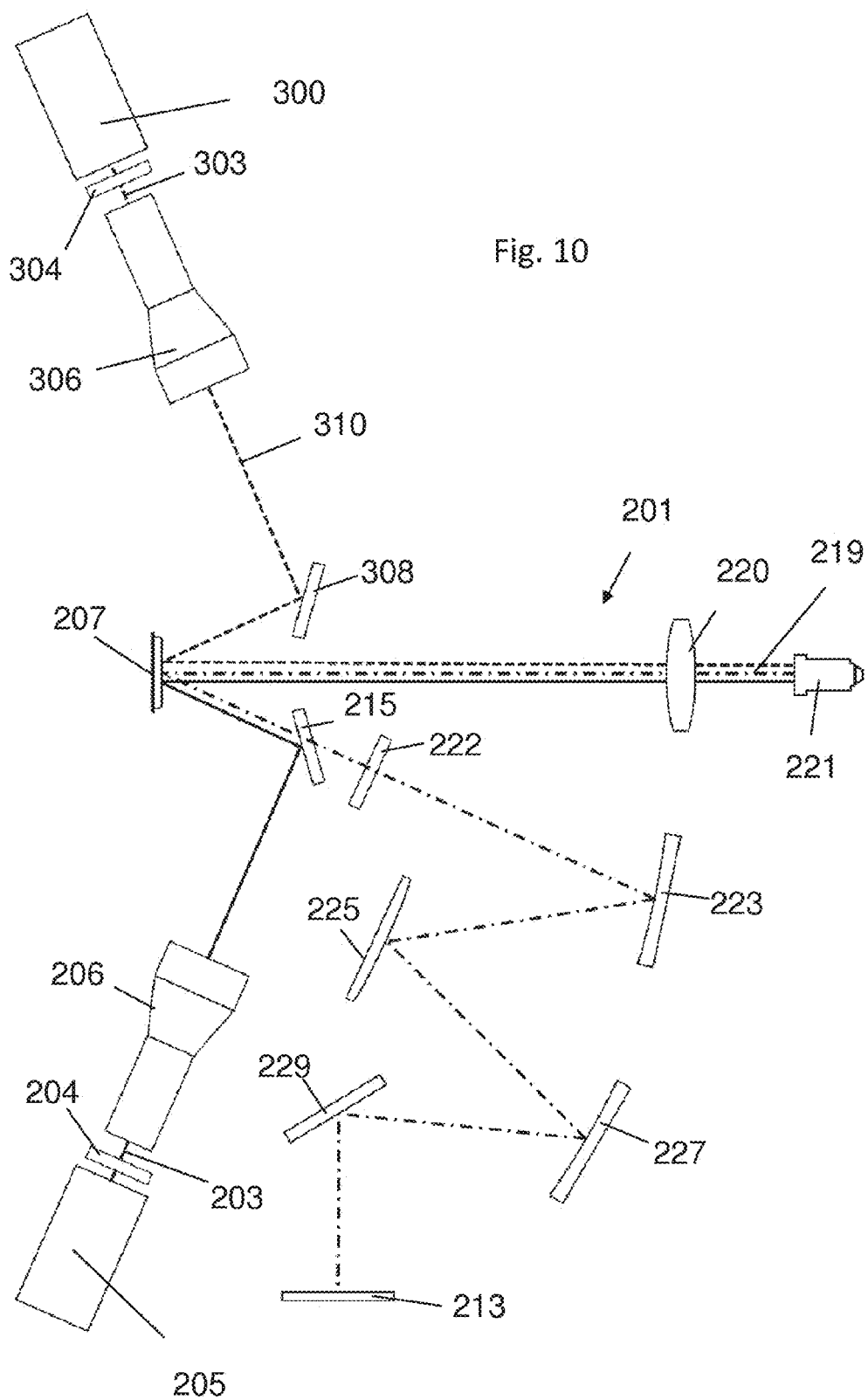
FIG. 10 illustrates the confocal microscope of FIG. 2 adapted to incorporate a second illumination source positioned symmetrically to the first such that micromirrors in the "off" position for light emitted by the first illumination source are in the "on" position for light emitted by the second illumination source.

FIG. 10 shows the confocal microscope of FIG. 2 adapted to incorporate a second light source 300. The first and second light sources 205, 300 are positioned symmetrically about an axis of symmetry passing through the digital micromirror device such that the micromirrors of the DMD 207 which are in the "off" position for light emitted by the first light source 205 are in the "on" position for light emitted by the second light source 300. The first light source 205 is positioned on a first side of the axis of symmetry, while the second light source 300 is positioned on a second side of the axis of symmetry opposite the first side. Preferably, as shown in the arrangement of FIG. 10, the axis of symmetry also passes through the microscope objective 221. In addition, as shown in the arrangement of FIG. 10, the axis of symmetry may be co-linear with the fluorescent light beam 219 emitted by the specimen being investigated.

It will be understood that the first and second light sources 205, 300 may be separate light sources (e.g. a pair of LEDs). Alternatively, the first and second light sources 205, 300 may be derived from the same (typically multi-wavelength) light source. For example, the optical output of a multi-wavelength light source may be split into first and second light sources 205, 300 each having different optical emission spectra.

A bandpass filter 304 may be provided between the second light source 300 and a telescope 306 (beam expander) which expands the diameter of the beam 303 emitted by the second light source 300. A flat mirror 308 may also be provided between the second light source 300 and the DMD 207. The flat mirror 308 in the configuration of FIG. 10 is arranged to reflect light emitted by the second light source 300 onto the DMD 207.

In the arrangement of FIG. 10, light 310 emitted by the second light source 300 is thus bandpass filtered and expanded by filter 304 and telescope 306 respectively before being reflected by the flat mirror 308 onto the DMD 207. Micromirrors in the "on" position for light emitted by the second light source 300 reflect a portion of the light 304 onto the microscope objective 221 through the tube lens 220. As per the arrangement of FIG. 2, one or more additional lenses may be provided between the DMD 207 and the tube lens 220 in order to provide a more convenient location for the primary conjugate plane and thus the DMD 207.

The second light source 300 may be configured to emit light having a different emission spectrum to the light emitted by the first light source 205 and/or to have a greater optical power output compared to the first light source 205. The portion of light 310 emitted by the second light source 300 which is incident on the microscope objective 221 may be used for a number of purposes, including:

- photo-uncaging. That is, light from the second light source 300 may be used to release a molecule from a caged group in the specimen being investigated to produce an active fluorescent molecule
- photoconversion. That is, a section of the specimen may be illuminated with light from the second light source 300 to change the wavelength at which the illuminated section of the specimen fluoresces
- fluorescence recovery after photobleaching (FRAP). That is, using light from the second light source 300 may be used to photobleach part of the specimen during a FRAP analysis;
- structured illumination. That is, the first and second light sources 205, 300 are used to illuminate the sample with structured patterns of light in order to achieve imaging resolutions beyond the diffraction limit;
- destructive interference. That is, when the first and second light sources 205, 300 are derived from a single (typically multi-wavelength) source as described above, the light emitted by the first light source 205 may be phase-shifted relative to the light emitted by the second light source 300 (or vice versa). The first and second light sources 205, 300 may also be arranged such that light emitted by the first light source 205 destructively interferes with light emitted by the second light source 300 in order to reduce the excitation spot size below the diffraction limit; and
- stimulated emission depletion (STED). In this case, the second light source 300 preferably has an emission spectrum which is red-shifted compared to the first source 205 and is configured to illuminate a first set of micromirrors (which are in the "on" state for light emitted by the second light source 300) of the DMD 2007 surrounding a second set of micromirrors (which are in the "on" state for light emitted by the first light source 205 and in the "off state for light emitted by the second light source 300) of the DMD 207. By doing so, light from the second light source 300 de-excites specimen molecules around the outer rim of the excitation spot produced by the first light source 205, which leads to a reduction in the size of the excitation spot below the diffraction limit.

Although the embodiment of FIG. 10 illustrates only a single detection system for detecting confocal light, it will be understood that a second detection system may be provided for detecting non-confocal light reflected by the DMD 207. The second detection system may, for example, be an identical mirror-image (about the axis of symmetry passing through the digital micromirror device described above) of the first detection system (thus comprising a dichroic mirror, emission filter, modified Offner triplet, single flat mirror and an image sensor) arranged to detect non-confocal light reflected by micromirrors which are in the "off" position for light emitted by the first light source 205.

The confocal light detected by the first detection system may be combined with the light detected by the second detection system using an image processor to produce a final image (e.g. the image detected by the first detection system may be subtracted from the image detected by the second detection system or vice versa). Combining the confocal and non-confocal light may allow a higher quality final image to be produced.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

Further modifications and improvements may be added without departing from the scope of the invention herein described or as defined by the appended claims. For example, where the modified Offner triplet (or relay) has been described with reference to a confocal microscope, other types of microscope or imaging devices may make use of the inherent advantages provided thereby. Such additional uses include digital projection systems, optical trapping systems, multi-object spectrometer devices, spectral imagers and the like. Any optical system currently using Offner triplets might be improved by using the modified Offner triplet arrangement.

The invention claimed is:

1. A microscope comprising:
    a light source;
    an objective lens configured to illuminate a specimen with light from the light source and collect light from the specimen;
    an optical arrangement comprising:
        an optical device comprising an imaging device;
        a digital micromirror device comprising a plurality of individually addressable micromirrors;
        a convex mirror;
        a concave mirror concentric to the convex mirror;
        wherein the convex mirror and the concave mirror define an optical triplet, said optical triplet located in an optical path with the digital micromirror device and the optical device; and
        wherein the concave mirror comprises two concave mirror sections, one or both concave mirror sections being moveable relative to the convex mirror so as to control an image mapping between the digital micromirror device and the optical device; and wherein the digital micromirror device is configured to direct at least a portion of a beam of light from the light source to the objective lens via a first path that is independent of the optical triplet, and to direct at least a portion of a beam of light from the objective lens to the imaging device via a second path that includes the optical triplet.

2. The microscope of claim 1, further comprising a dichroic mirror positioned between the digital micromirror device and the optical triplet, the dichroic mirror selected to reflect light from the light source and transmit light from the specimen.

3. The microscope of claim 2, wherein the improved microscope further comprises an emission filter positioned between the dichroic mirror and the imaging device and selected to absorb light at the wavelength of the light source.

4. The microscope of claim 1, wherein the improved microscope further comprises a tube lens positioned between the digital micromirror device and the objective lens to control the size of a cross section of the beam of light from the objective lens at the digital micromirror device.

5. The microscope of claim 1, wherein the improved microscope further comprises a beam expander positioned between the light source and digital micromirror device, the beam expander configured to increase the width of the beam of light from the light source to illuminate a plurality of micromirrors of the digital micromirror device.

6. The microscope of claim 1, wherein the digital micromirror device is configured to direct at least a portion of a beam of light from the light source to the objective lens along an optical path, and wherein the improved microscope further comprises one or more additional lenses provided in said optical path.

7. The microscope of claim 1, wherein the light source is a first light source and wherein the improved microscope further comprises a second light source.

8. The microscope of claim 7, wherein the first light source is configured to emit light having a first optical emission spectrum and the second light source is configured to emit light having a second optical emission spectrum different from the first optical emission spectrum.

9. The microscope of claim 8, wherein the second optical emission spectrum is red shifted relative to the first optical emission spectrum.

10. The microscope of claim 7, wherein the first light source is configured to emit light having a first optical power and the second light source is configured to emit light having a second optical power greater than the first optical power.

11. The microscope of claim 7, wherein the digital micrometer device is configured to direct at least a portion of a beam of light from the second light source to the objective lens.

12. The microscope of claim 7, wherein the first and second light sources are positioned symmetrically about an axis of symmetry passing through the digital micromirror device.

13. The microscope of claim 12, wherein the first light source is positioned on one side of the axis of symmetry and the second light source is positioned on a second side of the axis of symmetry opposite the first side.

14. The microscope of claim 7, wherein the first and second light sources are derived from a single light source.

15. A method of obtaining an image of a sample using the improved microscope of claim 1, comprising the steps:

(a) illuminating a plurality of micromirrors of the digital micromirror device with at least a portion of light from the light source;

(b) switching a virtual pinhole, consisting of N*N micromirrors of the digital micromirror device, from a first position to a second position at which a portion of the sample is illuminated with light from the N*N micromirrors and a corresponding portion of the imaging device is illuminated with corresponding light from the sample;

(c) obtaining an image of the light illuminating the imaging device while the virtual pinhole is in the second position; and (d) repeating steps (b) to (c) for a plurality of subsequent virtual pinholes until a predetermined number of portions of the image have been obtained.

16. The method of obtaining an image of claim 15, comprising the additional step of processing the portions to obtain the image of the sample.

17. The method of obtaining an image of claim 15, wherein the step of switching the virtual pinhole comprises simultaneously switching a plurality of virtual pinholes separated by an array width P*N, and step (d) comprises repeating steps (b) to (c) until P*P/N images are obtained within a P*P array.

18. The method of obtaining an image of claim 15, wherein step (d) includes that each of the subsequent virtual pinholes are separated from the immediately preceding virtual pinhole by N/2 micromirrors.

19. The method of obtaining an image of claim 15, wherein the method comprises the step of moving at least one of the mirrors of the optical triplet so as to change the magnification of the image on the imaging device.

20. The method of obtaining an image of claim 15, wherein the method comprises the step of moving at least one of the mirrors of the optical triplet so as to correct astigmatism in an image on the imaging device.

21. The method of obtaining an image of claim 15, wherein the method comprises the step of moving at least one of the mirrors of the optical triplet so as to achieve a one-to-one mapping of one or more micromirrors of the digital micromirror device to one or more pixels of the imaging device.

22. The method of obtaining an image of claim 15, wherein the method comprises the step of adjusting a lens comprised in the microscope so as to control the size of an illumination spot of light from the sample on the digital micromirror device.

23. The method of obtaining any image of claim 15, wherein the light source is a first light source, the method further comprising illuminating a plurality of micromirrors of the digital micromirror device with light from a second light source and directing at least a portion of said light onto the sample using said plurality of micromirrors.

24. The method of claim 23, wherein the first light source is configured to emit light having a first optical emission spectrum and the second light source is configured to emit light having a second optical emission spectrum different from the first optical emission spectrum.

25. The method of claim 23, wherein the first light source is configured to emit light having a first optical power and the second light source is configured to emit light having a second optical power greater than the first optical power.

* * * * *